United States Patent [19]

Mead et al.

[11] 4,380,253
[45] Apr. 19, 1983

[54] HEAT-INSULATED HOSE FOR LIQUEFIED GASES

[75] Inventors: Howard B. Mead, Tarporley; Graham L. Williams, Whitby, both of England

[73] Assignee: Shell Research Limited, London, England

[21] Appl. No.: 234,977

[22] Filed: Feb. 17, 1981

[30] Foreign Application Priority Data

Apr. 3, 1980 [GB] United Kingdom ............... 8011210

[51] Int. Cl.³ .............................................. F16L 9/16
[52] U.S. Cl. ................... 138/149; 138/103; 138/129; 138/130; 138/132; 138/178
[58] Field of Search ............ 138/103, 129, 130, 132, 138/137, 140, 141, 144, 149, 153, 172, 178

[56] References Cited

U.S. PATENT DOCUMENTS 3,042,080 7/1962 Dosker ........................... 138/149 X
3,317,074 5/1967 Barker et al. ...................... 138/149
3,548,884 12/1970 Ambrose ........................ 138/149 X
3,614,967 10/1971 Royston .......................... 138/149 X

FOREIGN PATENT DOCUMENTS 2832344 1/1980 Fed. Rep. of Germany ...... 138/149

*Primary Examiner*—James E. Bryant, III
*Attorney, Agent, or Firm*—Pravel, Gambrell, Hewitt, Kirk & Kimball

[57] ABSTRACT

A heat-insulated hose for liquefied gases, in particular, liquefied natural gas, comprising an inner hose (5) resistant to cryogenic temperatures, a plurality of successive layers (7A, 7B, 7C) of heat-insulating material, for example, polystyrene foam, arranged around the inner hose (5) and an outer protective sheath (18) arranged around the outermost layer of heat-insulating material, wherein each layer (7A, 7B, 7C) comprises a helically wound strip (6A, 6B, 6C) of fibre material holding together a mosaic of blocks of the heat-insulating material.

15 Claims, 3 Drawing Figures

HEAT-INSULATED HOSE FOR LIQUEFIED GASES

The invention relates to a heat-insulated hose for liquefied gases, such as, for example, liquefied natural gas or liquefied propane, which is suitable for loading and offloading of tankers transporting liquefied gases.

The invention relates more in particular to a hose of the above kind, which is adapted to float at the water surface and which is particularly suitable for use under emergency conditions when it is necessary to transfer liquefied gas from one tanker to another tanker, for example when a cargo tank of a tanker has been damaged, or when a tanker is in distress.

For this purpose, a heat-insulated hose for liquefied gases comprises, according to the invention, an inner hose resistant to cryogenic temperatures, a plurality of successive layers of heat-insulating material arranged around the inner hose and an outer protective sheath arranged around the outermost layer of heat-insulating material, wherein each layer comprises a helically wound strip of fibre material holding together a mosaic of blocks of the heat-insulating material.

In a preferred embodiment of the invention, a barrier of sheet material is arranged between each pair of adjacent layers of heat-insulating material. A suitable material for this barrier is, for example, a polyester film manufactured from polyethylene terephthalate which is marketed as Mylar (registered trade mark). Each barrier may be formed as a helically wound strip of the sheet material. These barriers have the advantage that they stop convection currents and moreover that they enable the layers of heat-insulating material to slide relatively to each other.

A suitable, heat-insulating material for use in the hose according to the invention is a plastics foam material. A very suitable heat-insulating material is polystyrene foam, since it is light and has a good compressive strength. Furthermore, it is not effected by the cryogenic temperatures and by the cryogenic liquids.

The fibre material for holding together the mosaic of blocks of the heat-insulating material may be, for example, hessian, a material which is strong for its light weight and which meets the low temperature requirements.

The invention will be explained with reference to the drawings, showing an embodiment of the invention, wherein FIG. 1 shows a longitudinal cross-section of a heat-insulated hose according to the invention;

Figure 1:
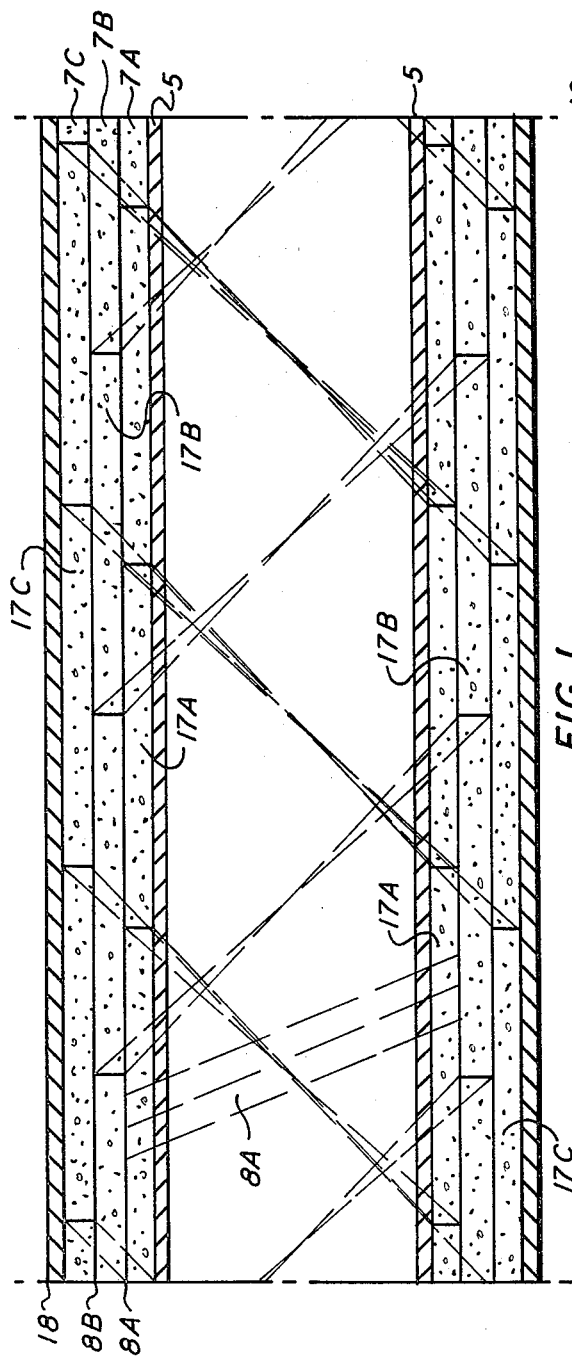

In the drawings, the reference numeral 5 indicates an inner hose, which is of a kind which maintains its strength and flexibility at cryogenic temperatures, such as the low temperatures of liquefied natural gas or liquefied methane. Such hoses are available on the market and since the construction of the inner hose 5 forms no part of the invention, the construction of the inner hose 5 will not be described in detail in this specification.

The inner hose 5 is surrounded by a number of successive layers of heat-insulating material, for example three layers 7A, 7B and 7C. The layer 7A is formed by helically winding a strip 17A of heat-insulating material around the inner hose 5, the layer 7B is formed by helically winding a strip 17B of heat-insulating material around the layer 7A and the layer 7C is formed by helically winding a strip 17C of heat-insulating material around the layer 7B.

Figure 2:
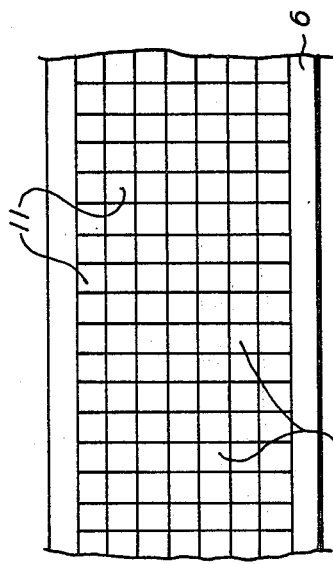
FIG. 2 shows a top plan view of an embodiment of a strip of heat-insulating material for use in the heat-insulated hose according to the invention.

A very attractive heat-insulating material for use in the hose according to the invention is, for example, polystyrene foam. A part of a strip 17 of polystyrene foam material is shown in FIG. 2. The strip 17 of polystyrene foam is backed by a backing strip of fibre material 6, which is preferably hessian. The polystyrene foam is cut as shown, so as to form a mosaic of blocks 11, which blocks 11 are held together by the strip of fibre material 6.

Figure 3:
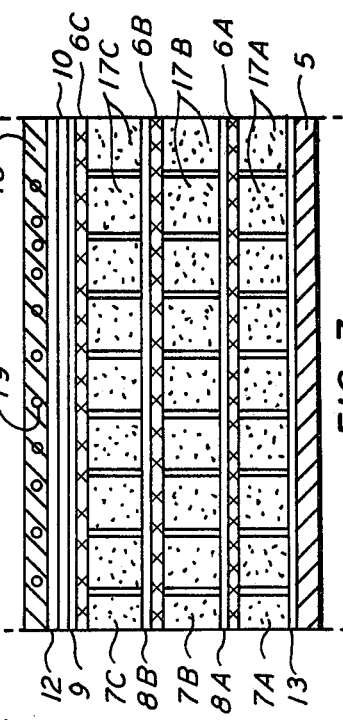
FIG. 3 shows in detail a longitudinal cross-section of a part of the heat-insulated hose according to the invention.

In FIG. 3, the layer 7A of polystyrene foam is formed by a helically wound strip 17A of polystyrene foam, which is provided with a backing strip 6A of hessian. The strip 17A of polystyrene foam is cut in the manner as shown in FIG. 2 so as to form a mosaic of blocks 11. Between the layer 17A and the inner hose 5 a layer 13 of polyester film material, such as Mylar, is present. On top of the layer 7A, a barrier 8A of sheet material is present. This barrier 8A is preferably a film of Mylar. The barrier 8A is formed, for example, by helically winding a strip of Mylar film material around the layer 7A. The layer 7B of polystyrene foam is formed by a helically wound strip 17B of polystyrene foam, which is provided with a backing strip 6B of hessian. The strip 17B of polystyrene foam is cut in the manner as shown in FIG. 2, so as to form a mosaic of blocks 11. On top of the layer 7B, a barrier 8B of sheet material is present. This barrier 8B is preferably a film of Mylar. The barrier 8B is formed for example by helically winding a strip of Mylar film material around the layer 7B. The layer 7C of polystyrene foam is formed by a helically wound strip 17C of polystyrene foam, which is provided with a backing strip 6C of hessian. The strip 17C of polystyrene foam is cut in the manner as shown in FIG. 2, so as to form a mosaic of blocks 11. On top of the layer 7C, a barrier 9 of sheet material is present. This barrier 9 is preferably a film of Mylar. The barrier 9 is formed, for example, by helically winding a strip of Mylar film material around the layer 7C. A layer 10 of cotton cloth and a layer 12 of Mylar film material is arranged around the barrier 9, whereas the layer 12 is enclosed by an outer protective sheath 18 which is gas-tight and liquid-tight, made of rubber or neoprene and incorporating a helically wound steel wire 19 a protective gas- and liquid-tight sheath 13, made of rubber or neoprene and incorporating a helically wound steel wire.

In the above embodiment of the invention, three layers of heat-insulating material are used. It will be clear that instead of three layers of heat-insulating material, more or less than three layers can be used, if desired.

By cutting the polystyrene foam into blocks and using the hessian backing sheet, as described, the advantage is obtained that the whole hose assembly can be extended axially without loss of its heat-insulating properties. Instead of polystyrene foam other plastics foam material can be used, for example polyurethane foam. Instead of plastics foam material, it is however also possible to use for example balsa wood, if desired. The heat-insulating material selected should of course have suitable tensile and compressive properties at cryogenic temperatures. The backing strip 6 need not be hessian;

instead cotton cloth, glass-fibre cloth, terylene cloth or any other suitable fibre material can be used for the backing strip 6, provided it is suitable for use at cryogenic temperatures.

The hose according to the invention is suitable for loading and off-loading tankers transporting liquefied gases, such as, for example, liquid propane or liquefied natural gas. The hose according to the invention is particularly suitable for use under emergency conditions, when it is necessary to transfer liquefied gas from one ship to another, for example when a liquefied gas tank of a tanker has been damaged.

The strips 17 of plastics foam material are preferably helically wound in alternate directions.

The heat-insulating material used is preferably of the closed cell type, since this has the advantage that it will not absorb water in the event of leakage of the outer protective sheath.

We claim:

1. A heat-insulated hose for liquefied gases, comprising:
    an inner hose which maintains its strength and flexibility at cryogenic temperatures;
    a plurality of successive layers of heat-insulating material arranged around the inner hose;
    said layers of heat-insulating material comprising helically wound backing strips of fibre material upon which a mosiac of blocks of heat-insulating material is melted; and
    an outer protective sheath arranged around the outermost layer of heat-insulating material.

2. The hose of claim 1, further including a barrier of sheet material arranged between adjacent layers of heat-insulating material.

3. The hose of claim 2, wherein the sheet material is a polyester film.

4. The hose of claim 3, wherein the polyester film is polyethylene terephthalate.

5. The hose of claim 2, wherein said barrier of sheet material is helically wound between adjacent layers of heat-insulating material.

6. The hose of claim 1, wherein each successive layer of heat-insulating material is helically wound in an opposite direction from the helical winding of the previous layer.

7. The hose of claim 1, wherein the backing strips of fiber material are selected from the group comprising hessian, cotton cloth, glass-fiber cloth and terylene cloth.

8. The hose of claim 1, wherein the blocks of heat-insulating material are composed of a foamed plastic material.

9. The hose of claim 8, wherein the foamed plastic material is polystyrene.

10. The hose of claim 8, wherein the foamed plastic material is polyurethane.

11. The hose of claim 1, wherein the blocks of heat-insulating material are composed of balsa wood.

12. The hose of claim 1, wherein the outer protective sheath is composed of rubber.

13. The hose of claim 1, wherein the outer protective sheath is composed of neoprene.

14. The hose of claim 1, wherein the outer protective sheath is reinforced by a helically wound, metallic wire.

15. The hose of claim 1, having an overall density lower than that of water, enabling the hose to float on water.

* * * * *

UNITED STATES PATENT AND TRADEMARK OFFICE
CERTIFICATE OF CORRECTION

PATENT NO. : 4,380,253

DATED : April 19, 1983

INVENTOR(S) : Howard B. Mead and Graham L. Williams

It is certified that error appears in the above-identified patent and that said Letters Patent are hereby corrected as shown below:

In column 3, line 29, please delete "melted" and insert therefor --mounted--.

Signed and Sealed this

Eleventh Day of October 1983

[SEAL]

Attest:

GERALD J. MOSSINGHOFF

Attesting Officer     Commissioner of Patents and Trademarks